(12) United States Patent
Lee et al.

(10) Patent No.: US 8,411,024 B2
(45) Date of Patent: *Apr. 2, 2013

(54) IMAGE DISPLAY DEVICE

(75) Inventors: Juyoung Lee, Gyeonggi-do (KR); Jikyoung Kim, Gyeonggi-do (KR); Wookyu Sang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 165 days.

This patent is subject to a terminal disclaimer.

(21) Appl. No.: 12/955,023

(22) Filed: Nov. 29, 2010

(65) Prior Publication Data

US 2011/0279490 A1    Nov. 17, 2011

(30) Foreign Application Priority Data

May 13, 2010    (KR) .................. 10-2010-0044860

(51) Int. Cl.
    *G09G 3/36*    (2006.01)
(52) U.S. Cl. ........................ 345/102; 345/419
(58) Field of Classification Search .................. 345/691, 345/102, 98–100, 690, 419
    See application file for complete search history.

(56) References Cited

U.S. PATENT DOCUMENTS

| 2005/0219188 | A1* | 10/2005 | Kawabe et al. ................. 345/94 |
| 2006/0262055 | A1* | 11/2006 | Takahara ........................ 345/81 |
| 2007/0152934 | A1* | 7/2007 | Maeda ............................ 345/92 |
| 2007/0229447 | A1* | 10/2007 | Takahara et al. ............... 345/102 |
| 2008/0079001 | A1* | 4/2008 | Umezaki et al. ................ 257/59 |
| 2008/0170028 | A1* | 7/2008 | Yoshida ........................ 345/100 |
| 2008/0180385 | A1* | 7/2008 | Yoshida et al. ............... 345/102 |
| 2009/0224245 | A1* | 9/2009 | Umezaki ........................ 257/59 |
| 2010/0103089 | A1* | 4/2010 | Yoshida et al. ............... 345/102 |
| 2011/0227066 | A1* | 9/2011 | Umezaki ........................ 257/43 |
| 2011/0260169 | A1* | 10/2011 | Umezaki et al. ................ 257/59 |

* cited by examiner

*Primary Examiner* — Ricardo L Osorio
(74) *Attorney, Agent, or Firm* — Morgan, Lewis & Bockius LLP

(57) ABSTRACT

An image display device comprises a liquid crystal display panel, panel driving circuits, a backlight configured to include a plurality of light source blocks, and a controller configured to modulate input data to generate image data synchronized with N multiple frame frequency, control the panel driving circuits such that same image data are displayed every two consecutive frame periods, control the light source blocks to be sequentially turned on during a light source scanning period, and control the light source blocks to be simultaneously turned off during a light source blinking period between neighboring light source scanning periods.

10 Claims, 10 Drawing Sheets

IMAGE DISPLAY DEVICE

This application claims the priority and the benefit of Korea Patent Application No. 10-2010-44860 filed on May 13, 2010, the entire contents of which is incorporated herein by reference for all purposes as if fully set forth herein.

BACKGROUND

1. Field

This document relates to an image display device capable of improving a display quality.

2. Related Art

Based on the progress of a variety of image processing techniques, there has been recently developed an image display device capable of selectively implementing two-dimensional images (hereinafter, referred to as "2D images") and three-dimensional stereoscopic images (hereinafter, referred to as "3D images").

As methods of implementing 3D images in the image display device, there are known a stereoscopic technique and an autostereoscopic technique.

The stereoscopic technique uses binocular parallax images which are great in the stereoscopic effect. The stereoscopic technique has a type of using glasses and a type of not using glasses, and, at present, the two types have been put into practical use. In the type of not using glasses, the stereoscopic images are implemented by dividing optical axes of binocular parallax images, by using optical plates such as parallax barriers provided at front and rear surfaces of a display panel. In the type of using glasses (hereinafter, referred to as a "glasses type"), binocular parallax images are displayed on a direct view display panel or a projector by changing polarization directions or in the temporal division manner, and polarization glasses or liquid crystal shutter glasses are used to implement stereoscopic images.

The glasses type is greatly classified into a first polarization filter type using a pattern retarder film and polarization glasses, a second polarization filter type using a switching liquid crystal layer and polarization glasses, and a liquid crystal shutter glasses type. The first and second polarization filter types have a low transmittance of 3D images due to the pattern retarder film or the switching liquid crystal layer which functions as a polarization filter and formed in a liquid crystal display panel.

The liquid crystal shutter glasses type implements 3D images by alternately displaying a left eye image and a right image on a display device by the frame unit, and opening and closing the left and right eye shutters of the liquid crystal shutter glasses in synchronization with the display timing. In the liquid crystal shutter glasses, only the left eye shutter is opened for the frame period when the left eye image is displayed, and only the right eye shutter is opened for the frame period when the right eye image is displayed, thereby generating the binocular parallax in a temporal division manner.

In order to selectively implement 3D images and 2D images, the latest image display device mainly employs a hold type display device such as a liquid crystal display ("LCD"). The LCD maintains data which has been charged for the previous frame period due to the response time of the liquid crystal, till new data is written therein. When 3D images are implemented by the image display device, due to the response time delay characteristic of the liquid crystal, 3D crosstalk of a ghost pattern can be viewed for a time when the left eye image is changed to the right eye image or the right eye image is changed to the left eye image. A principle by which the 3D crosstalk is viewed will be described in outline.

If it is assumed that the left eye shutter of the liquid crystal shutter glasses is opened for the n-th frame period and the right eye shutter of the liquid crystal shutter glasses is opened for the (n+1)-th frame, in the LCD, left eye image data is sequentially addressed for the n-th frame period and right eye image data is sequentially addressed for the (n+1)-th frame period. When the left eye shutter of the liquid crystal shutter glasses is being opened, a portion of pixels (pixels placed in the lower part of the panel, which lies in the latter addressing order) where the left eye image data for the n-th frame has not been written yet maintains the right eye image data which has already been written for the (n−1)-th frame period. Therefore, a viewer's left eye views a portion of the right eye image for the (n−1)-th frame along with the left eye image for the n-th frame in an overlapping manner. In addition, when the right eye shutter of the liquid crystal shutter glasses is being opened, a portion of pixels (pixels placed in the lower part of the panel, which lies in the latter addressing order) where the left eye image data for the (n+1)-th frame has not been written yet maintains the left eye image data which has already been written for the n-th frame period. Therefore, a viewer's right eye views a portion of the left eye image for the n-th frame along with the right eye image for the (n+1)-th frame in an overlapping manner.

In addition, when 2D moving pictures are implemented by the image display device, due to the maintaining characteristic of the liquid crystal, there may be occurrence of a motion blurring that a screen is not clear and appears blurred. In order to remove the motion blurring, it is necessary to improve a moving picture response time ("MPRT").

SUMMARY

Embodiments of this document provide an image display device capable of improving a display quality by removing the 3D crosstalk and the motion blurring.

According to an exemplary embodiment of this document, there is an image display device comprising a liquid crystal display panel configured to selectively implement 2D images and 3D images; panel driving circuits configured to drive the liquid crystal display panel; a backlight configured to include a plurality of light source blocks and supply light to the liquid crystal display panel; and a controller configured to modulate input data to generate image data synchronized with N (where N is a positive integer equal to or more than 4) multiple frame frequency, control the panel driving circuits such that the same image data is displayed in the liquid crystal display panel every two consecutive frame periods, control the light source blocks to be sequentially turned on during a light source scanning period, and control the light source blocks to be simultaneously turned off during a light source blinking period positioned between neighboring light source scanning periods, wherein the light source scanning period is defined as a period which lasts from a certain time point in a latter frame period of a first pair of frames formed by the two frame periods to a certain time point in a former frame period of a second pair of frames formed by another two frame periods, and wherein the former frame period is subsequent to the latter frame period.

When the 3D images are implemented, the light source scanning period may comprise first and second light source scanning periods adjacent to each other with the light source blinking period interposed between the first and second light source scanning periods, wherein the first light source scanning period may last from a certain time point in a latter frame period of left eye frame periods formed by the two frame periods to a certain time point in a former frame period of right eye frame periods formed by the two frame periods, and wherein the second light source scanning period may last from a certain time point in a latter frame period of the right eye frame periods to a certain time point in a former frame period of the left eye frame periods.

The image display device may further comprises liquid crystal shutter glasses of which a left eye shutter and a right eye shutter are alternately opened and closed in synchronization with images displayed in the liquid crystal display panel, wherein the left eye shutter may be opened during the first light source scanning period and closed during the second light source scanning period, and wherein the right eye shutter may be opened during the second light source scanning period and closed during the first light source scanning period.

Here, the left eye shutter and the right eye shutter may be mutually reversely opened and closed in the light blinking period.

When the 2D images are implemented, the light source scanning period may comprise first and second light source scanning periods adjacent to each other with the light source blinking period interposed between the first and second light source scanning periods, wherein the first light source scanning period may last from a certain time point in a latter frame period of the first pair of frames to a certain time point in a former frame period of the second pair of frames, and wherein the second light source scanning period may last from a certain time point in a latter frame period of the second pair of frames to a certain time point in a former frame period of a third pair of frames formed by the two frame periods.

The light source scanning period and the light source blinking period may be determined depending on a response time of liquid crystal.

When the 2D images are implemented, the controller may perform a data interpolation modulation and a data doubling modulation to generate the image data.

When the 3D images are implemented, the controller may perform a data division modulation and a data doubling modulation to generate the image data.

The controller may repeatedly supply the same image data to the panel driving circuits for a former frame period and a latter frame period of each pair of frames.

The controller may control the panel driving circuits to be paused for a latter frame period of each pair of frames.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
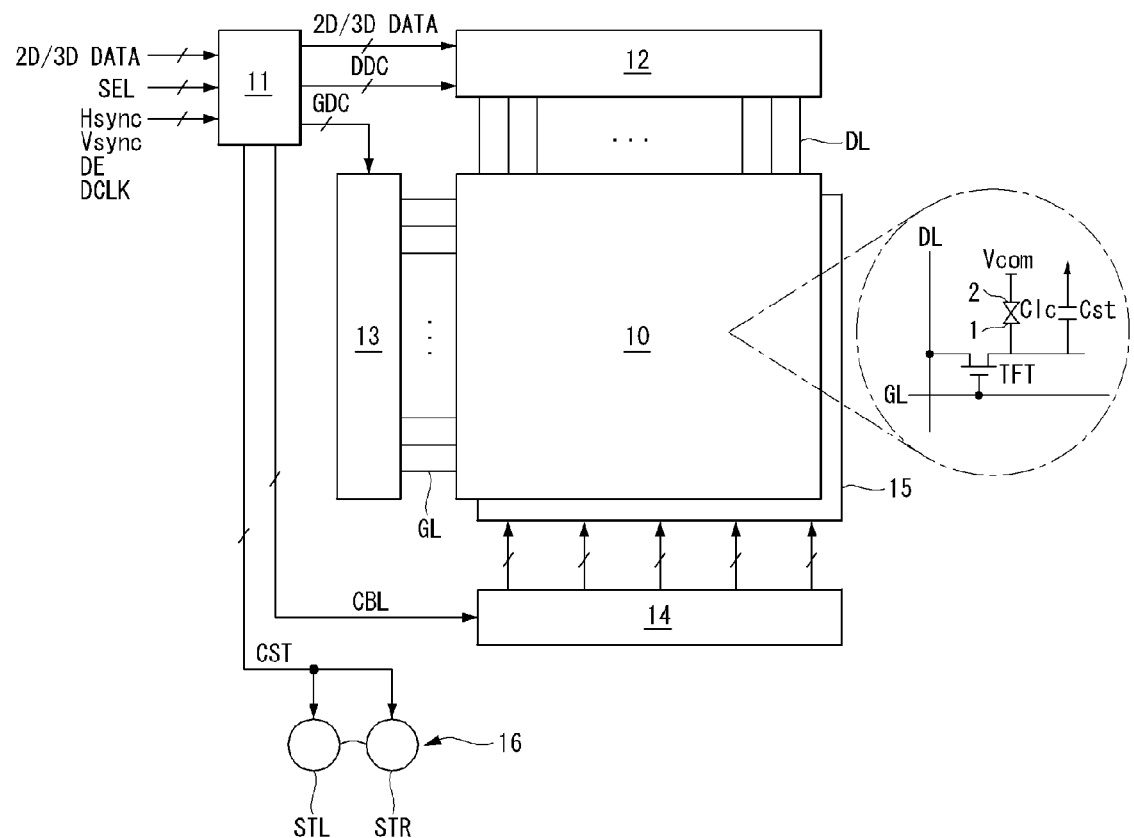
FIG. 1 is a block diagram illustrating an image display device according to an embodiment of this document.

Hereinafter, embodiments of this document will be described with reference to FIGS. 1 to 10. Like reference numerals designate like elements throughout the specification.

FIG. 1 shows an image display device according to an embodiment of this document.

In FIG. 1, the image display device comprises a liquid crystal display panel 10, a controller 11, a data driver 12, a gate driver 13, a light source driver 14, a backlight unit 15, and liquid crystal shutter glasses 16. The data driver 12 and the gate driver 13 constitute a panel driving circuit.

The liquid crystal display panel 10 comprises two glass substrates and a liquid crystal layer interposed therebetween. The lower glass substrate of the liquid crystal display panel 10 is provided with a plurality of data lines DL and a plurality of gate lines GL intersecting the data lines DL. The liquid crystal display panel 10 is provided with liquid crystal cells Clc which are formed at the intersections of the data lines DL and the gate lines GL and arranged in a matrix. In addition, the lower glass substrate of the liquid crystal display panel 10 is provided with TFTs (thin film transistors), and pixel electrodes 1 and storage capacitors Cst connected to the TFTs. Black matrices, color filters, and common electrodes 2 are formed on the upper glass substrate of the liquid crystal display panel 10. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Polarizers are respectively attached to the outer surfaces of the lower and upper glass substrate of the display panel 10. In addition, alignment layers are formed on the inner surfaces having contact with the liquid crystal layer to set pretilt angles of the liquid crystal layer.

The data driver 12 comprises a plurality of data drive ICs. Each of the data drive ICs comprises a shift register for sampling clock signals, a register which temporarily stores digital data output from the controller 11, a latch which stores the amount of one line data in response to clock signals from the shift register and outputs the amount of one line data at a time, a digital/analogue converter which selects positive/negative gamma voltages by referring to a gamma reference voltage corresponding to the digital data values from the latch, multiplexers which select data lines DL which are applied with the analogue data converted as the positive/negative gamma voltages, and output buffers connected between the multiplexers and the data lines DL. The data driver 12 converts 2D and 3D data synchronized with a frame frequency of f (input frame frequency)×N (where N is a positive integer equal to or more than 4), into analogue data voltages for supply to the data lines DL.

The gate driver 13 comprises a plurality of gate drive ICs. Each of the gate drive ICs comprises a shift register, a level shifter which converts an output signal from the shift register to have a swing range suitable to drive the TFTs of the liquid crystal cells, and output buffers. The gate driver 13 sequentially outputs scan pulses (or gate pulses) synchronized with the frame frequency of f×N Hz for supply to the gate lines GL.

The light source driver 14 sequentially drives light source blocks so as to be synchronized with the data display in the liquid crystal display panel 10 under the control of the controller 11. The turned-on and turned-off time of the light source blocks is determined depending on a PWM signal from the controller 11. The turned-on time of the light source blocks is lengthened as a duty ratio of the PWM signal increases, whereas it is shortened as the duty ratio of the PWM signal decreases.

The backlight unit 15 is turned on for a preset specific time to supply light to the liquid crystal display panel 10 and is turned off during the remaining time period, and repeats such turning-on and turning-off at a specific cycle. The backlight unit 15 comprises a plurality of light sources which are turned on depending on the driving power supplied from the light source driver 14, a light guide plate (or a diffusion plate), a plurality of optical sheets, and the like. The backlight unit 15 may be implemented by a direct type or an edge type. The light sources may comprise any one or more of HCFL (Hot Cathode Fluorescent Lamp), CCFL (Cold Cathode Fluorescent Lamp), EEFL (External Electrode Fluorescent Lamp), and LED (Light Emitting Diode).

The liquid crystal shutter glasses 16 comprise a left eye shutter STL and a right eye shutter STR which are electrically controlled independently from each other. Each of the left eye shutter STL and the right eye shutter STR comprises a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is applied with a reference voltage, and the second transparent electrode is applied with ON and Off voltages. Under the control of the controller 11, each of the left eye shutter STL and the right shutter STR transmits light from the liquid crystal display panel 10 when the ON voltage is applied to the second transparent electrode, whereas it block light from the liquid crystal display panel 10 when the OFF voltage is applied to the second transparent electrode.

The controller 11 is supplied with timing signals and 2D and 3D data from a video source (not shown). The timing signals includes a vertical synchronizing signal Vsync, a horizontal synchronizing signal Hsync, a data enable signal DE, a dot clock DCLK, and so forth.

The controller 11 multiplies the input frame frequency f by N to generate a frame frequency (hereinafter, referred to as an "N multiple frame frequency") Nf and generates display panel control signals DDC and GDC, a light source control signal CBL, and a liquid crystal shutter control signal CST with respect to the frame frequency.

The display panel control signals DDC and GDC include a data control signal for controlling an operation timing of the data driver 12 and a gate control signal GDC for controlling an operation timing of the gate driver 13. The data control signal DDC includes a source start pulse SSP, a source sampling clock SSC, a source output enable signal SOE, a polarity control signal POL, and so on. The gate control signal GDC includes a gate start pulse GSP, a gate shift clock GSC, a gate output enable signal GOE, and the like. The light source control signal CBL controls the light driver 14 such that the light sources of the backlight unit 15 are turned on and off at a specific cycle. The liquid crystal shutter control signal CST enables the left eye shutter STL and the right eye shutter STR of the liquid crystal shutter glasses 16 to be alternately opened and closed at a specific cycle.

The controller 11 selects either the 2D data or the 3D data supplied from the video source in response to a selection signal SEL and modulates it to be synchronized with the N multiple frame frequency Nf. When selecting the 2D data, the controller 11 may modulate the data through the data interpolation and the data doubling. When selecting the 3D data, the controller 11 may modulate the data through the data division and the data doubling. The controller 11 may control the drivers 12 and 13 such that the same data is displayed every two consecutive frame periods. For this, the controller 11 may control the drivers 12 and 13 to repeatedly address the same frame data in the display panel 10 for two frame periods, or to address the data therein for one of the two frame periods and to maintain the addressed data for the other frame period.

Hereinafter, the image display device according to various embodiments of this document will be described in detail with reference to FIGS. 2 to 10. Here, the embodiments will be described by exemplifying a case where "N" is 4, that is, a case where the frame frequency is 240 Hz when the input frame frequency is 60 Hz. In the figures, the reference numerals "L" and "R" denote 3D image data and respectively denote left eye image data and right eye image data, and the reference numerals "D1" to "D3" denote 2D image data.

Figure 2:
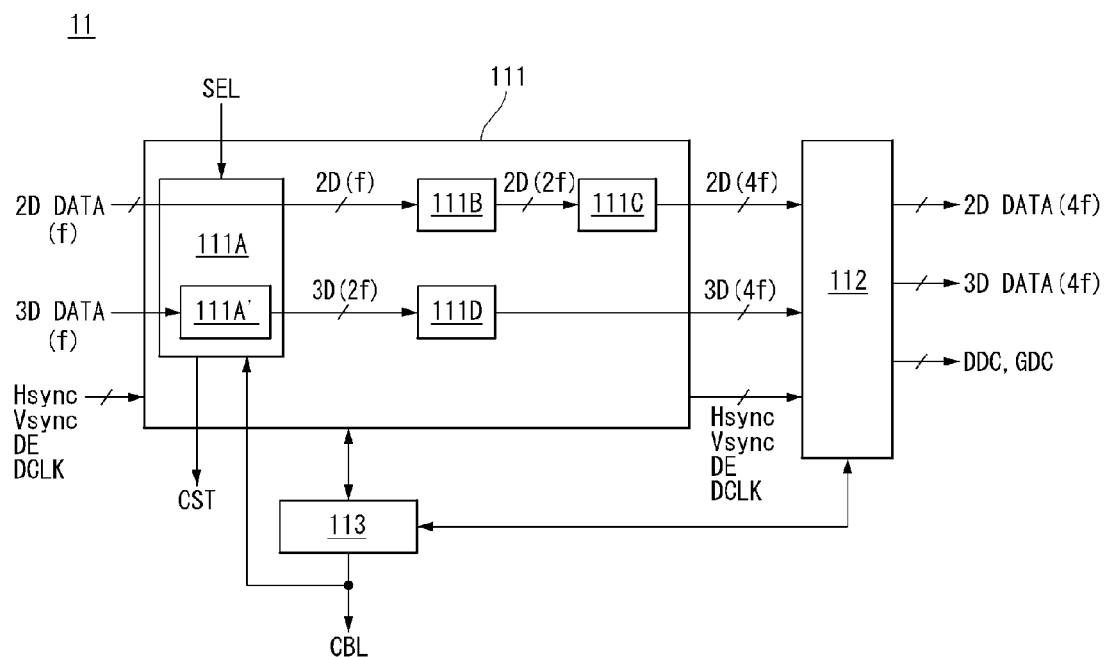
FIG. 2 is a detailed block diagram illustrating the controller shown in FIG. 1.

FIG. 2 shows the controller 11 in detail.

In FIG. 2, the controller 11 comprises a data processing unit 111, a timing controller 112, and a light source control unit 113.

The data processing unit 111 modulates input 2D and 3D image data (or frame data) to be synchronized with the quadruple frame frequency 4f. For this, the data processing unit 111 comprises a data selection unit 111A, a 2D image data interpolation unit 111B, a 2D image data doubling unit 111C, and a 3D image data doubling unit 111D.

Responsive to a first logic level of the selection signal SEL, the data selection unit 111A bypasses the input 2D image data and blocks the 3D image data. Responsive to a second logic level of the selection signal SEL, the data selection unit 111A blocks the 2D data and processes the input 3D image data for output. When processing the input 3D image data, the data selection unit 111A divides the input 3D image data into left eye image data L and right eye image data R by using a 3D formatter 111A', thereby outputting double 3D image data synchronized with double frame frequency 2f. In addition, when processing the input 3D image data, the data selection unit 111A determines frames based on counted values of the timing signal such as the vertical synchronizing signal Vsync or the like, and generates the liquid crystal shutter control signal CST for alternately opening and closing the left eye shutter STL and right eye shutter STR of the liquid crystal shutter glasses 16 at a cycle of two frame periods. Particularly, by referring to logic levels of the light source control signal CBL, the data selection unit 111A controls the liquid crystal shutter control signal CST such that the opening and closing of the shutters STL and STR can be decided at the same time while the light source blocks are all turned off. The opening and closing cycle of the shutters STL and STR are synchronized with the double frame frequency 2f.

The 2D image data interpolation unit 111B interpolates the input 2D image data which has been bypassed from the data selection unit 111A, to output double 2D image data synchronized with the double frame frequency 2f. In order to interpolate the data, the 2D data interpolation unit 111B inserts an interpolated frame between each pair of neighboring input frames by referring to a memory (not shown).

The 2D image data doubling unit 111C doubles the double 2D image data from the 2D data interpolation unit 111B to output four times 2D image data synchronized with the four times frame frequency 4f, and supplies the four times 2D image data to the timing controller 112. For doubling the data, the 2D image data doubling unit 111C stores the double 2D image data in a frame memory and copies it, and inserts the copied frame between each pair of neighboring double frames.

The 3D image data doubling unit 111D doubles the double 3D image data from the data selection unit 111A to output four times 3D image data synchronized with the four times frame frequency 4f, and supplies the four times 3D image data to the timing controller 112. For doubling the data, the 3D image data doubling unit 111D stores the double 3D image data in the frame memory and copies it, and inserts the copied frame between each pair of neighboring double frames.

The timing controller 112 rearranges the four times 2D image data and the four times 3D image data which are selectively output from the data processing unit 111, to be suitable for the resolution of the liquid crystal display panel 10. Also, the timing controller 112 repeatedly supplies the same frame data to the data driver 12 for two frame periods or once supplies the frame data thereto. The timing controller 112 generates the display panel control signals DDC and GDC synchronized with the four times frame frequency 4f based on the timing signals Vsync, Hsync, DE and DCLK, thereby controlling operations of the drivers 12 and 13. The timing controller 112 may control the drivers 12 and 13 such that they are paused for odd-numbered frame periods or even-numbered frame periods.

The light source control unit 113 outputs the light source control signal CBL for controlling the turning-on and turning-off of the light source blocks. In response to the light source control signal CBL, the light source blocks are sequentially turned on after being delayed from a start point of two frame periods allocated to display of the same image data by a predetermined time which is determined based on a response time of the liquid crystal. For this, the light source control unit 113 sequentially outputs the light source control signal CBL, for controlling each light source block, with a high level to sequentially turn on the light sources during a light source scanning period lasting from a certain time point in a latter frame period of a first pair of frames formed by two frame periods allocated to display of the same image data to a certain time point in a former frame period of a second pair of frames formed by two frames which is subsequent to the latter frame period and allocated to display of the same image data. In addition, the light source control unit 113 simultaneously outputs the light source control signal CBL, for controlling each light source block, with a high level to simultaneously turn off the light sources during a light source blinking period positioned between the light source scanning periods. The light source control unit 113 may be embedded in the data processing unit 111 or the timing controller 112.

Figure 3:
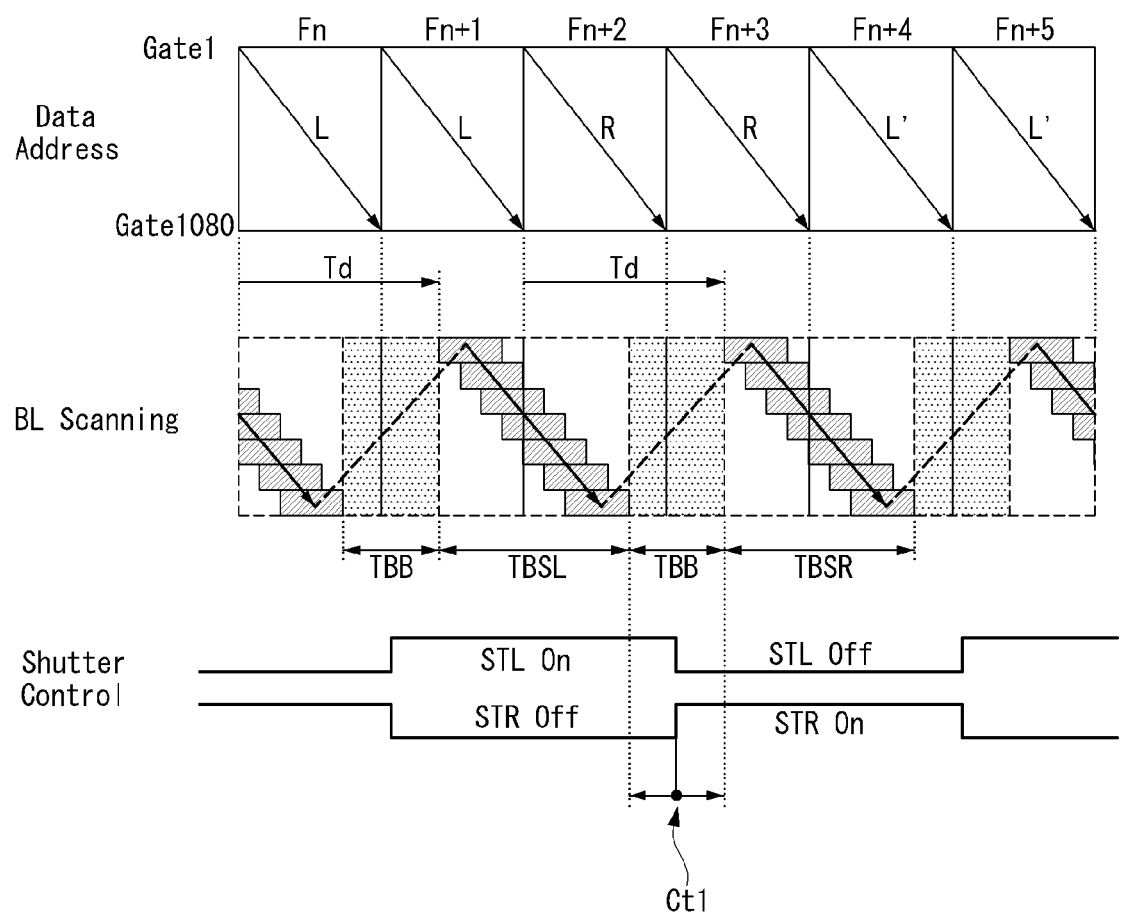
FIG. 3 is a diagram illustrating an example of driving timings when 3D images are implemented, as a first embodiment of this document.
Figure 4:
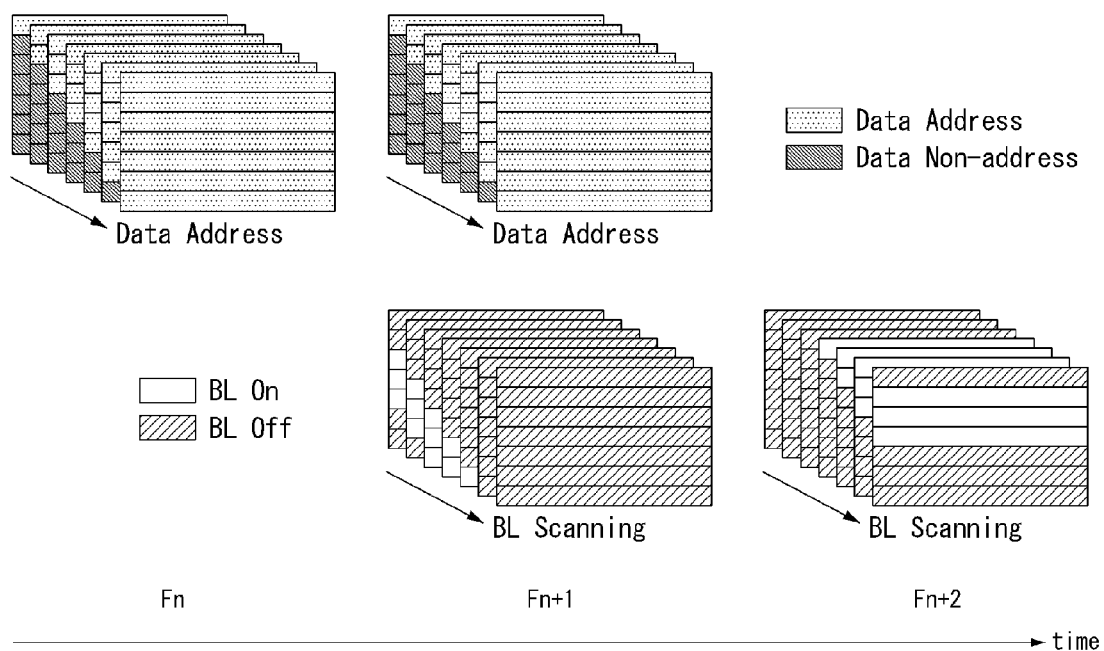
FIG. 4 is a diagram illustrating data addressing and turned-on and turned-off states of light source blocks according to the driving timings shown in FIG. 3.

FIG. 3 shows an example of driving timings when 3D images are implemented, as a first embodiment of this document. FIG. 4 shows data addressing and turned-on and turned-off states of the light source blocks according to the driving timings shown in FIG. 3.

In FIGS. 3 and 4, when 3D images are implemented, the controller 11 controls the drivers 12 and 13 such that the same four times 3D image data L is twice repeatedly addressed in the liquid crystal display panel 10 for the n-th and (n+1)-th frame periods Fn and Fn+1 ("left eye frame periods"), the same four times 3D image data R is twice repeatedly addressed in the liquid crystal display panel 10 for the (n+2)-th and (n+3)-th frame periods Fn+2 and Fn+3 ("right eye frame periods"), and the same four times 3D image data L' is twice repeatedly addressed in the liquid crystal display panel 10 for the (n+4)-th and (n+5)-th frame periods Fn+4 and Fn+5 ("left eye frame periods"). The data addressing for the response of the liquid crystal is completed for the former frame periods Fn, Fn+2 and Fn+4 of the respective left eye and right eye frame periods. The response of the liquid crystal may be completed in the upper part of the liquid crystal display panel 10 which lies in the relatively former data addressing order, within the former frame periods Fn, Fn+2 and Fn+4, but the completion point of the response of the liquid crystal in the lower part of the liquid crystal display panel 10, which lies in the relatively latter addressing order, may be extended up to the latter frame periods Fn+1, Fn+3 and Fn+5. The reason why the same image data L, R and L' as the former frame periods Fn, Fn+2 and Fn+4 is repeatedly addressed for the latter frame periods Fn+1, Fn+3 and Fn+5 is for compensating the stance maintaining force of the liquid crystal.

In consideration of the response time of the liquid crystal, the controller 11 controls a plurality of light source blocks (for example, seven light source blocks) to be sequentially turned on during a first light source scanning period TBSL lasting from a certain time point which is delayed by a predetermined time Td from the start point of the left eye frame periods Fn and Fn+1 and lies in the latter frame period Fn+1, to a certain time point lying in the former frame period Fn+2 of the right eye frame periods Fn+2 and Fn+3, thereby controlling the display of the left eye image data L where the response of the liquid crystal is completed. Also, in consideration of the response time of the liquid crystal, the controller 11 controls a plurality of light source blocks to be sequentially turned on during a second light source scanning period TBSR lasting from a certain time point which is delayed by a predetermined time Td from the start point of the right eye frame periods Fn+2 and Fn+3 and lies in the latter frame period Fn+3, to a certain time point lying in the former frame period Fn+4 of the right eye frame periods Fn+4 and Fn+5, thereby controlling the display of the right eye image data R where the response of the liquid crystal is completed. Further, during a light source blinking period TBB positioned between the light source scanning periods TBSL and TBSR, the controller 11 controls the light source blocks to be turned off at the same time. The length of the light source blinking period TBB is determined depending on the turned-on periods of the light source blocks along with the predetermined time Td. A turned-on duty ratio of the light source blocks, which is decided by a turned-on duty ratio of the PWM signal, may be decided to about 20% to 50%. The turned-on duty ratio of the light source blocks shown in FIG. 3 is about 23%.

The controller 11 controls the left eye shutter STL of the liquid crystal shutter glasses 16 to be opened and simultaneously the right eye shutter STR to be closed so as to overlap the first light source scanning period TBSL for displaying the left eye images. The controller 11 controls the left eye shutter STL to be closed and simultaneously the right eye shutter STR to be open so as to overlap the second light sources scanning period TBSR for displaying the right eye image. At this time, the opening and closing point Ct1 of the shutters STL and STR is positioned in the light source blinking period.

In this way, if the same image data is twice repeatedly addressed for the respective left eye and right eye frame periods, and the turned-on timing of the light sources is adjusted as described above, the 3D crosstalk can be considerably lowered. In addition, since the opening and closing point Ct1 of the shutters STL and STR is set to be positioned in the light source blinking period TBB, a timing margin can be notably improved when designing the opening and closing point Ct1 in consideration of the response of the liquid crystal in the liquid crystal shutter glasses 16.

Figure 5:
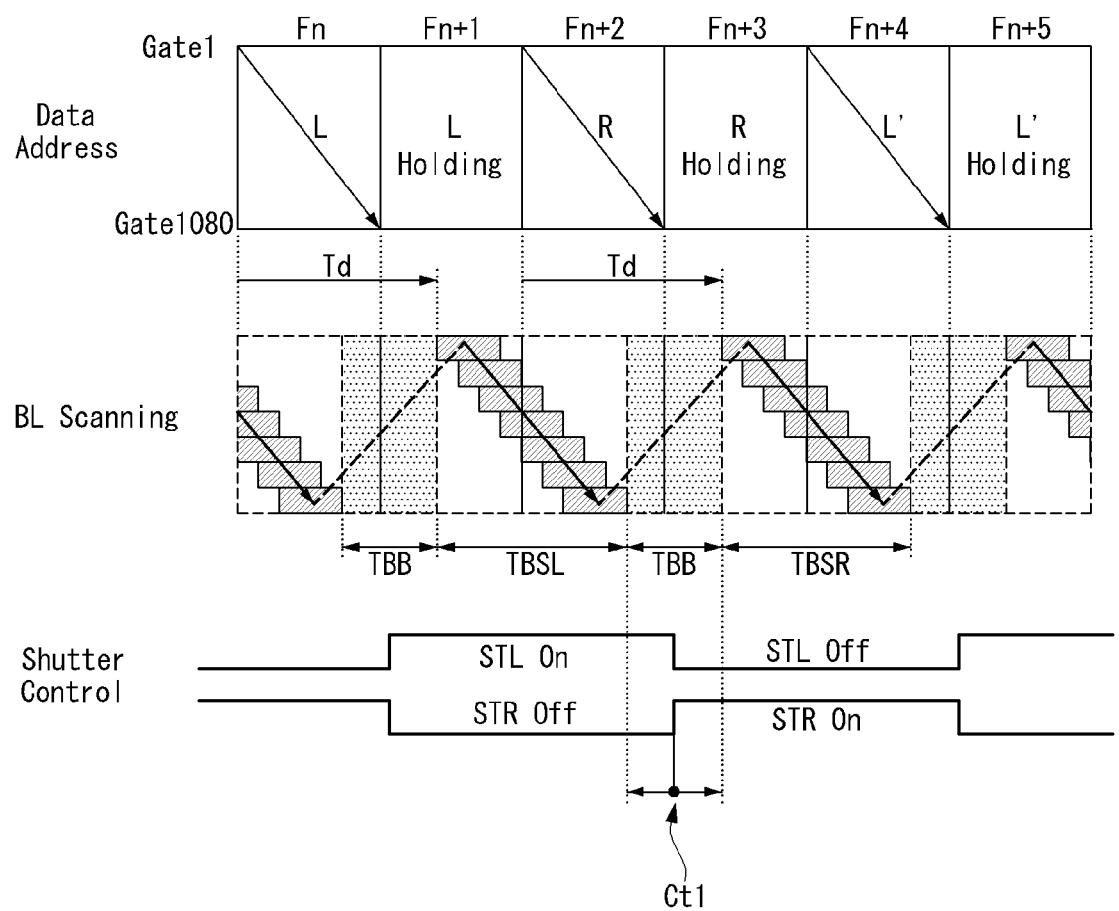
FIG. 5 is a diagram illustrating another example of driving timings when 3D images are implemented, as a second embodiment of this document.
Figure 6:
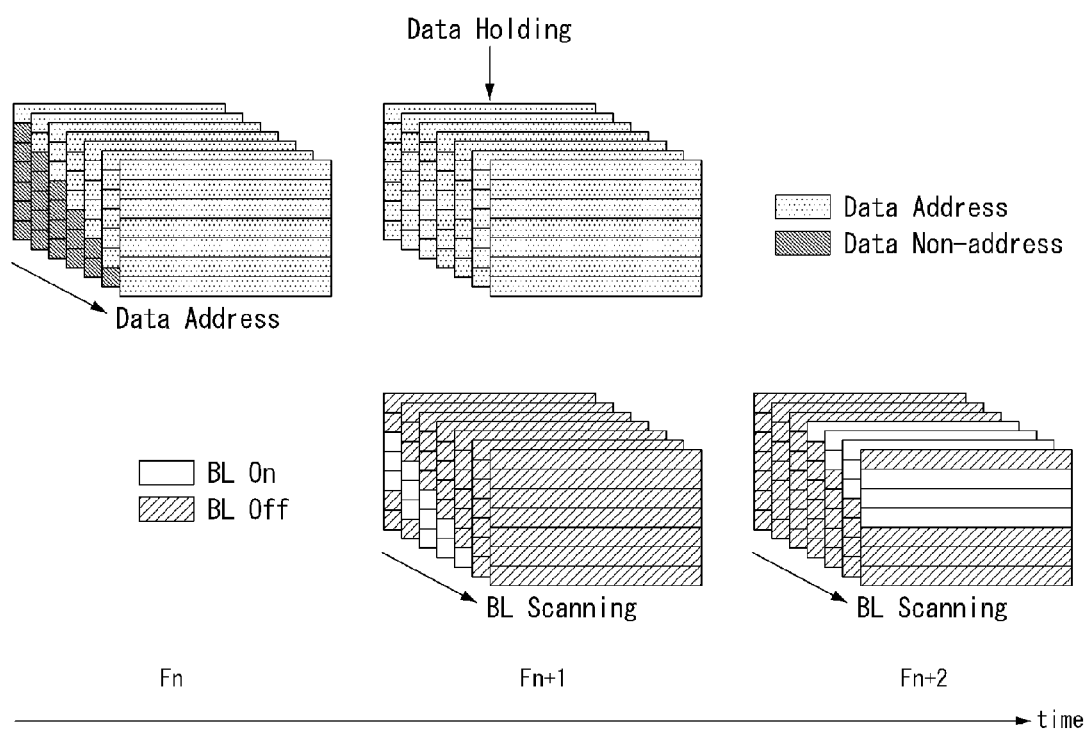
FIG. 6 is a diagram illustrating data addressing and turned-on and turned-off states of light source blocks according to the driving timings shown in FIG. 5.

FIG. 5 shows another example of driving timings when 3D images are implemented, as a second embodiment of this document. FIG. 6 shows data addressing and turned-on and turned-off states of the light source blocks according to the driving timings shown in FIG. 5.

In FIGS. 5 and 6, the second embodiment has substantially the same operation and effect as the first embodiment except that the drivers 12 and 13 are paused for the latter frame periods Fn+1, Fn+3 and Fn+5 so as to maintain the image data L, R and L' for the latter frame periods Fn+1, Fn+3 and Fn+5, which has been addressed for the former frame periods Fn, Fn+2 and Fn+4. For the pause driving, the controller 11 may selectively stop the operation of the data driver 12 or the operation of the gate driver 13, or stop the operations of both of them for each of the latter frame periods Fn+1, Fn+3 and Fn+5. Such an alternating pause driving is advantageous in reducing the heat emission of the drivers 12 and 13 and the power consumption.

Figure 7:
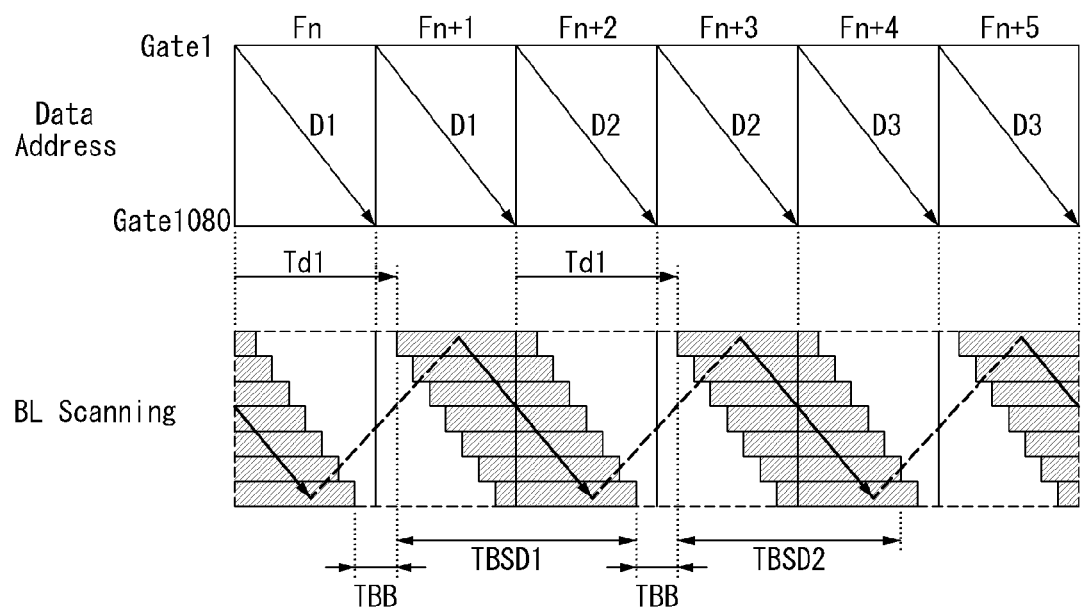
FIG. 7 is a diagram illustrating an example of driving timings when 2D images are implemented, as a third embodiment of this document.
Figure 8:
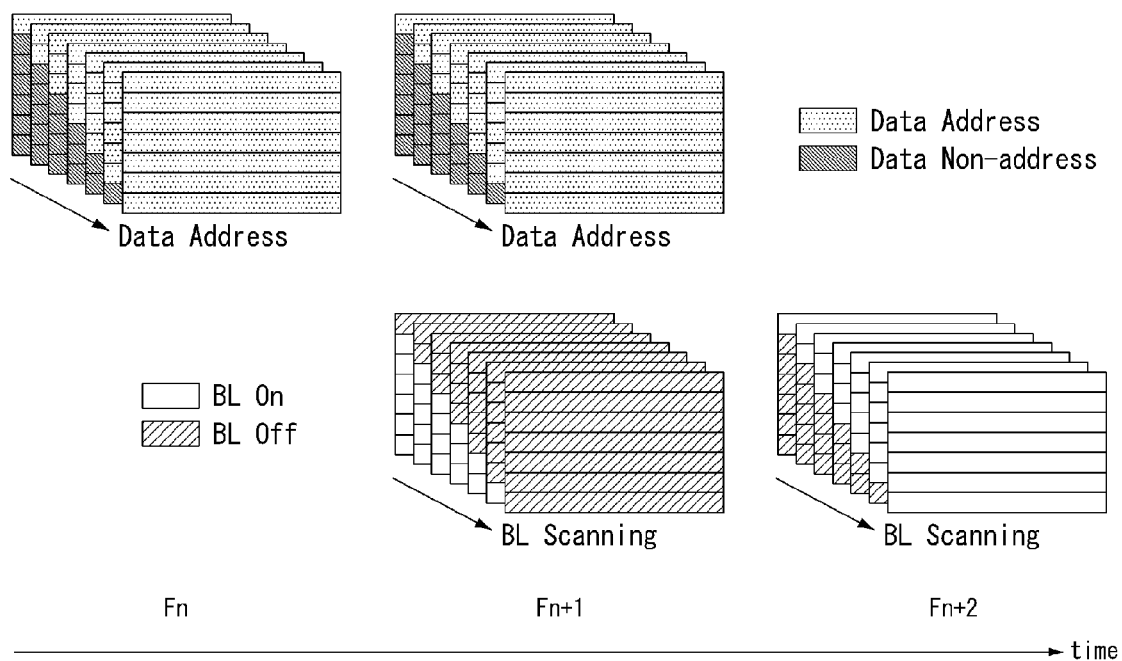
FIG. 8 is a diagram illustrating data addressing and turned-on and turned-off states of light source blocks according to the driving timings shown in FIG. 7.

FIG. 7 shows an example of driving timings when 2D images are implemented, as a third embodiment of this document. FIG. 8 shows data addressing and turned-on and turned-off states of the light source blocks according to the driving timings shown in FIG. 7.

In FIGS. 7 and 8, when 2D images are implemented, the controller 11 controls the drivers 12 and 13 such that the same first image data D1 is twice repeatedly addressed in the liquid crystal display panel 10 for the n-th and (n+1)-th frame periods Fn and Fn+1, the same second image data D2 is twice repeatedly addressed in the liquid crystal display panel 10 for the (n+2)-th and (n+3)-th frame periods Fn+2 and Fn+3, and the same third image data D3 is twice repeatedly addressed in the liquid crystal display panel 10 for the (n+4)-th and (n+5)-th frame periods Fn+4 and Fn+5. The data addressing for the response of the liquid crystal is completed for the n-th, (n+2)-th, and (n+4)-th frame periods Fn, Fn+2 and Fn+4 (hereinafter, referred to as "former frame periods"). The response of the liquid crystal may be completed in the upper part of the liquid crystal display panel 10 which lies in the relatively former data addressing order, within the former frame periods Fn, Fn+2 and Fn+4, but the completion point of the response of the liquid crystal in the lower part of the liquid crystal display panel 10, which lies in the relatively latter addressing order, may be extended up to the (n+1)-th, (n+3)-th, and the (n+5)-th frame periods Fn+1, Fn+3 and Fn+5 (hereinafter, referred to as "latter frame periods"). The reason why the same image data D1, D2 and D3 as the former frame periods Fn, Fn+2 and Fn+4 is repeatedly addressed for the latter frame periods Fn+1, Fn+3 and Fn+5 is for compensating the stance maintaining force of the liquid crystal.

In consideration of the response time of the liquid crystal, the controller 11 controls a plurality of light source blocks (for example, seven light source blocks) to be sequentially turned on during a first light source scanning period TBSD1 lasting from a certain time point which is delayed by a predetermined time Td1 from the start point of the two frame periods Fn and Fn+1 allocated to display of the first image data D1 and lies in the latter frame period Fn+1, to a certain time point lying in the former frame period Fn+2 of the two frame periods Fn+2 and Fn+3 allocated to display of the second image data D2, thereby controlling the display of the first image data D1 where the response of the liquid crystal is completed. Also, in consideration of the response time of the liquid crystal, the controller 11 controls a plurality of light source blocks to be sequentially turned on during a second light source scanning period TBSD2 lasting from a certain time point which is delayed by a predetermined time Td1 from the start point of the two frame periods Fn+2 and Fn+3 allocated to display of the second image data D2 and lies in the latter frame period Fn+3, to a certain time point lying in the former frame period Fn+4 of the two frame periods Fn+4 and Fn+5 allocated to display of the third image data D3, thereby controlling the display of the second image data D2 where the response of the liquid crystal is completed. Further, during a light source blinking period TBB positioned between the light source scanning periods TBSD1 and TBSD2, the controller 11 controls the light source blocks to be turned off at the same time. The length of the light source blinking period TBB is determined depending on the turned-on periods of the light source blocks along with the predetermined time Td1. A turned-on duty ratio of the light source blocks, which is decided by a turned-on duty ratio of the PWM signal, may be decided to about 30% to 80%. The turned-on duty ratio of the light source blocks shown in FIG. 7 is about 50%.

In this way, if the same image data is twice repeatedly addressed for the respective two frame periods, and the turned-on timing of the light sources is adjusted as described above, the MPRT are greatly improved, and particularly, uniformity of the MPRT in the entire liquid crystal display panel 10 becomes better.

Figure 9:
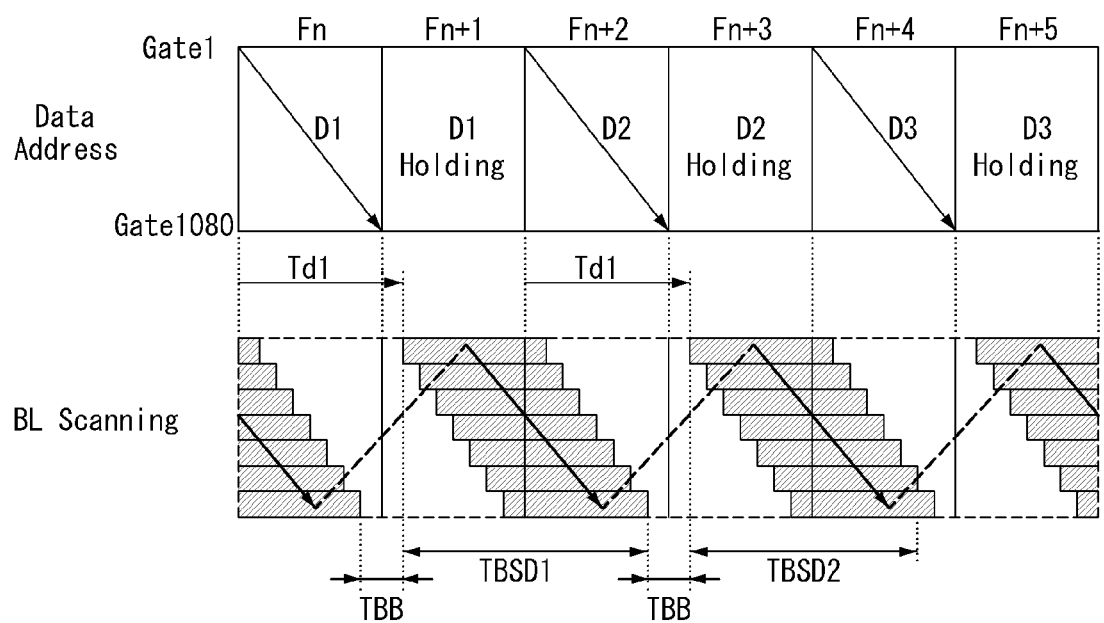
FIG. 9 is a diagram illustrating another example of driving timings when 3D images are implemented, as a fourth embodiment of this document.
Figure 10:
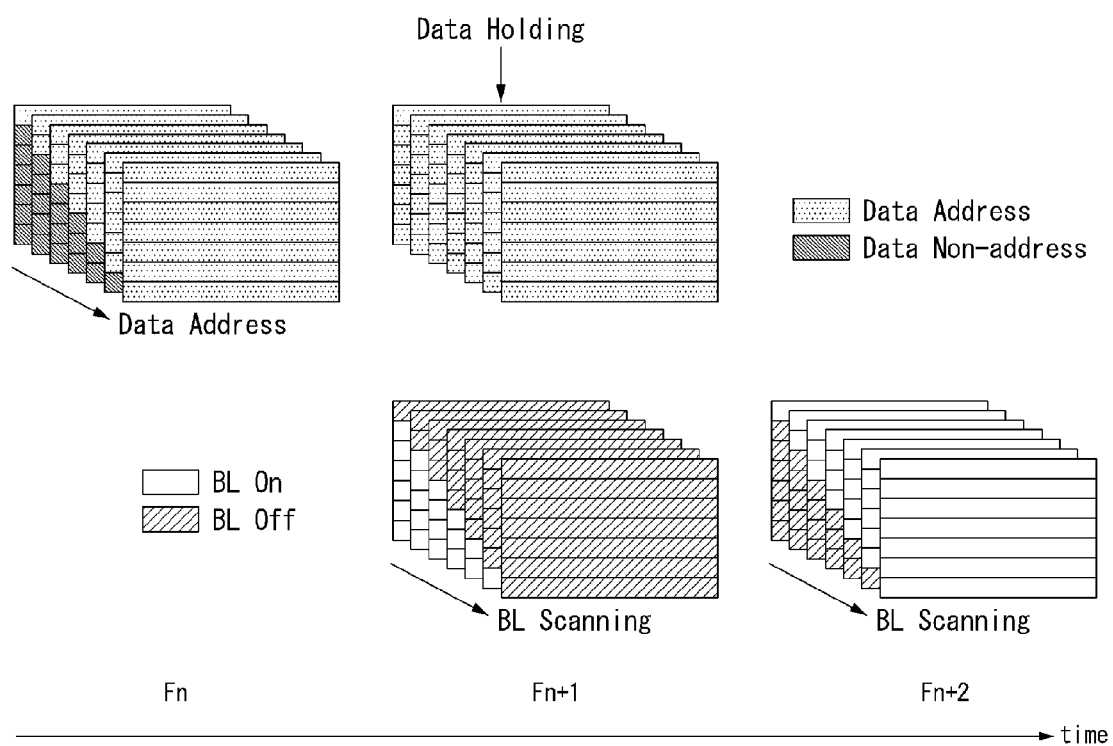
FIG. 10 is a diagram illustrating data addressing and turned-on and turned-off of light source blocks according to the driving timings shown in FIG. 9.

FIG. 9 shows another example of driving timings when 2D images are implemented, as a fourth embodiment of this document. FIG. 10 shows data addressing and turned-on and turned-off states of the light source blocks according to the driving timings shown in FIG. 9.

In FIGS. 9 and 10, the fourth embodiment has substantially the same operation and effect as the third embodiment except that the drivers 12 and 13 are paused for the latter frame periods Fn+1, Fn+3 and Fn+5 so as to maintain the image data D1, D2 and D3 for the latter frame periods Fn+1, Fn+3 and Fn+5, which has been addressed for the former frame periods Fn, Fn+2 and Fn+4. For the pause driving, the controller 11 may selectively stop the operation of the data driver 12 or the operation of the gate driver 13, or stop the operations of both of them for each of the latter frame periods Fn+1, Fn+3 and Fn+5. Such an alternating pause driving is advantageous in reducing the heat emission of the drivers 12 and 13 and the power consumption.

As described above, by multiplying the frame frequency and adjusting the data addressing and the driving of the light sources based thereon, the image display device according to the embodiments of this document can improve the MPRT when 2D images are implemented, and prevent 3D crosstalk from being generated when 3D images are implemented, thereby greatly improving the display quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims.

What is claimed is:

1. An image display device comprising:
a liquid crystal display panel configured to selectively implement 2D images and 3D images;
panel driving circuits configured to drive the liquid crystal display panel;
a backlight configured to include a plurality of light source blocks and supply light to the liquid crystal display panel; and
a controller configured to modulate input data to generate image data synchronized with N (where N is a positive integer equal to or more than 4) multiple frame frequency, control the panel driving circuits such that same image data are displayed in the liquid crystal display panel every two consecutive frame periods, control the light source blocks to be sequentially turned on during a light source scanning period and control the light source blocks to be simultaneously turned off during a light source blinking period between neighboring light source scanning periods, wherein the light source scanning period is defined as a period which lasts from a certain time point in a latter frame period of a first pair of frames formed by the two frame periods to a certain time point in a former frame period of a second pair of frames formed by another two frame periods, and
wherein the former frame period is subsequent to the latter frame period.

2. The image display device of claim 1, wherein when the 3D images are implemented, the light source scanning period comprises first and second light source scanning periods adjacent to each other with the light source blinking period interposed between the first and second light source scanning periods,
wherein the first light source scanning period lasts from a certain time point in a latter frame period of left eye frame periods formed by the two frame periods to a certain time point in a former frame period of right eye frame periods formed by the two frame periods, and
wherein the second light source scanning period lasts from a certain time point in a latter frame period of the right eye frame periods to a certain time point in a former frame period of the left eye frame periods.

3. The image display device of claim 2, further comprising liquid crystal shutter glasses of which a left eye shutter and a right eye shutter are alternately opened and closed in synchronization with images displayed in the liquid crystal display panel,
wherein the left eye shutter is opened during the first light source scanning period and is closed during the second light source scanning period, and
wherein the right eye shutter is opened during the second light source scanning period and is closed during the first light source scanning period.

4. The image display device of claim 3, wherein the left eye shutter and the right eye shutter are mutually reversely opened and closed in the light blinking period.

5. The image display device of claim 1, wherein when the 2D images are implemented, the light source scanning period comprises first and second light source scanning periods adjacent to each other with the light source blinking period interposed between the first and second light source scanning periods,
wherein the first light source scanning period lasts from a certain time point in a latter frame period of the first pair of frames to a certain time point in a former frame period of the second pair of frames, and
wherein the second light source scanning period lasts from a certain time point in a latter frame period of the second pair of frames to a certain time point in a former frame period of a third pair of frames formed by the two frame periods.

6. The image display device of claim 1, wherein the light source scanning period and the light source blinking period are determined depending on a response time of liquid crystal.

7. The image display device of claim 1, wherein when the 2D images are implemented, the controller performs a data interpolation modulation and a data doubling modulation to generate the image data.

8. The image display device of claim 1, wherein when the 3D images are implemented, the controller performs a data division modulation and a data doubling modulation to generate the image data.

9. The image display device of claim 1, wherein the controller repeatedly supplies the same image data to the panel driving circuits for a former frame period and a latter frame period of each pair of frames.

10. The image display device of claim 1, wherein the controller controls the panel driving circuits to be paused for a latter frame period of each pair of frames.

* * * * *